US009287718B2

(12) United States Patent
Kari et al.

(10) Patent No.: US 9,287,718 B2
(45) Date of Patent: Mar. 15, 2016

(54) METHOD, APPARATUS, AND COMPUTER PROGRAM PRODUCT FOR FOREIGN OBJECT DETECTION PARAMETER AND CHARGING DATA COMMUNICATION WITH WIRELESS CHARGING CAPABLE BATTERY PACK

(71) Applicant: Nokia Corporation, Espoo (FI)

(72) Inventors: Juhani Valdemar Kari, Lieto (FI); Petri Martti Vuori, Salo (FI)

(73) Assignee: Nokia Technologies Oy, Espoo (FI)

( * ) Notice: Subject to any disclaimer, the term of this patent is extended or adjusted under 35 U.S.C. 154(b) by 438 days.

(21) Appl. No.: 13/782,351

(22) Filed: Mar. 1, 2013

(65) Prior Publication Data

US 2014/0247004 A1    Sep. 4, 2014

(51) Int. Cl.
| | | |
|---|---|---|
| H02J 7/00 | (2006.01) | |
| H02J 5/00 | (2006.01) | |
| H02J 7/02 | (2006.01) | |
| H04B 5/00 | (2006.01) | |

(52) U.S. Cl.
CPC ............. *H02J 5/005* (2013.01); *H02J 7/0004* (2013.01); *H02J 7/025* (2013.01); *H02J 2007/0001* (2013.01); *H04B 5/0062* (2013.01); *H04B 5/0068* (2013.01); *H04B 5/0075* (2013.01); *Y02B 60/50* (2013.01)

(58) Field of Classification Search
CPC ..................................................... H02J 5/005
USPC ........................................................ 320/108
See application file for complete search history.

(56) References Cited

U.S. PATENT DOCUMENTS

| | | | | |
|---|---|---|---|---|
| 2002/0086718 A1* | 7/2002 | Bigwood et al. | ............... | 455/572 |
| 2011/0196544 A1* | 8/2011 | Baarman et al. | ............... | 700/291 |
| 2011/0241613 A1* | 10/2011 | Ryu | ..................... | H01F 27/365 |
| | | | | 320/108 |
| 2012/0146577 A1* | 6/2012 | Tanabe | .......................... | 320/108 |
| 2012/0206098 A1* | 8/2012 | Kim | .............. | 320/108 |
| 2012/0242285 A1* | 9/2012 | Jung et al. | ..................... | 320/108 |
| 2012/0274271 A1* | 11/2012 | Thompson | .............. | H02J 7/025 |
| | | | | 320/108 |
| 2013/0162220 A1* | 6/2013 | Iijima et al. | ................... | 320/137 |
| 2013/0221910 A1* | 8/2013 | Kim | ........................ | H02J 5/005 |
| | | | | 320/108 |
| 2013/0246675 A1* | 9/2013 | Korpinen et al. | ............. | 710/110 |

(Continued)

FOREIGN PATENT DOCUMENTS

| | | |
|---|---|---|
| CN | 101075749 A | 11/2007 |
| CN | 101325345 A | 12/2008 |

(Continued)

OTHER PUBLICATIONS

European Search Report for Application No. EP14155341, completed Jun. 25, 2014.

(Continued)

*Primary Examiner* — Richard V Muralidar
(74) *Attorney, Agent, or Firm* — Locke Lord LLP

(57) ABSTRACT

Method, apparatus, and computer program product example embodiments provide device-to-device charging. According to an example embodiment of the invention, a method comprises accessing, by an apparatus, parameters relating to power loss in wirelessly charging a rechargeable battery, when the battery is located in a device to be powered by the rechargeable battery; and transmitting, by the apparatus, to a wireless charger, the accessed parameters relating to power loss when the apparatus is associated with the device to be powered by the rechargeable battery.

25 Claims, 7 Drawing Sheets

(56) References Cited

U.S. PATENT DOCUMENTS

2014/0084857 A1* 3/2014 Liu et al. .................. 320/108
2014/0143588 A1* 5/2014 Leinonen .................. 714/2

FOREIGN PATENT DOCUMENTS

| EP | 2 610 997 A2 | 7/2013 |
| WO | WO 2009105595 A2 | 8/2009 |

OTHER PUBLICATIONS

System Description Wireless Power Transfer, vol. I: Low Power, Part 1: Interface Definition, Version 1.0.3, Sep. 2011, Wireless Power Consortium, Sep. 2011.
English Language Machine Translation of Chinese Patent Application Publication No. CN101075749A—6 pages.
English Language Machine Translation of Chinese Patent Application Publication No. CN101325345A—6 pages.

* cited by examiner

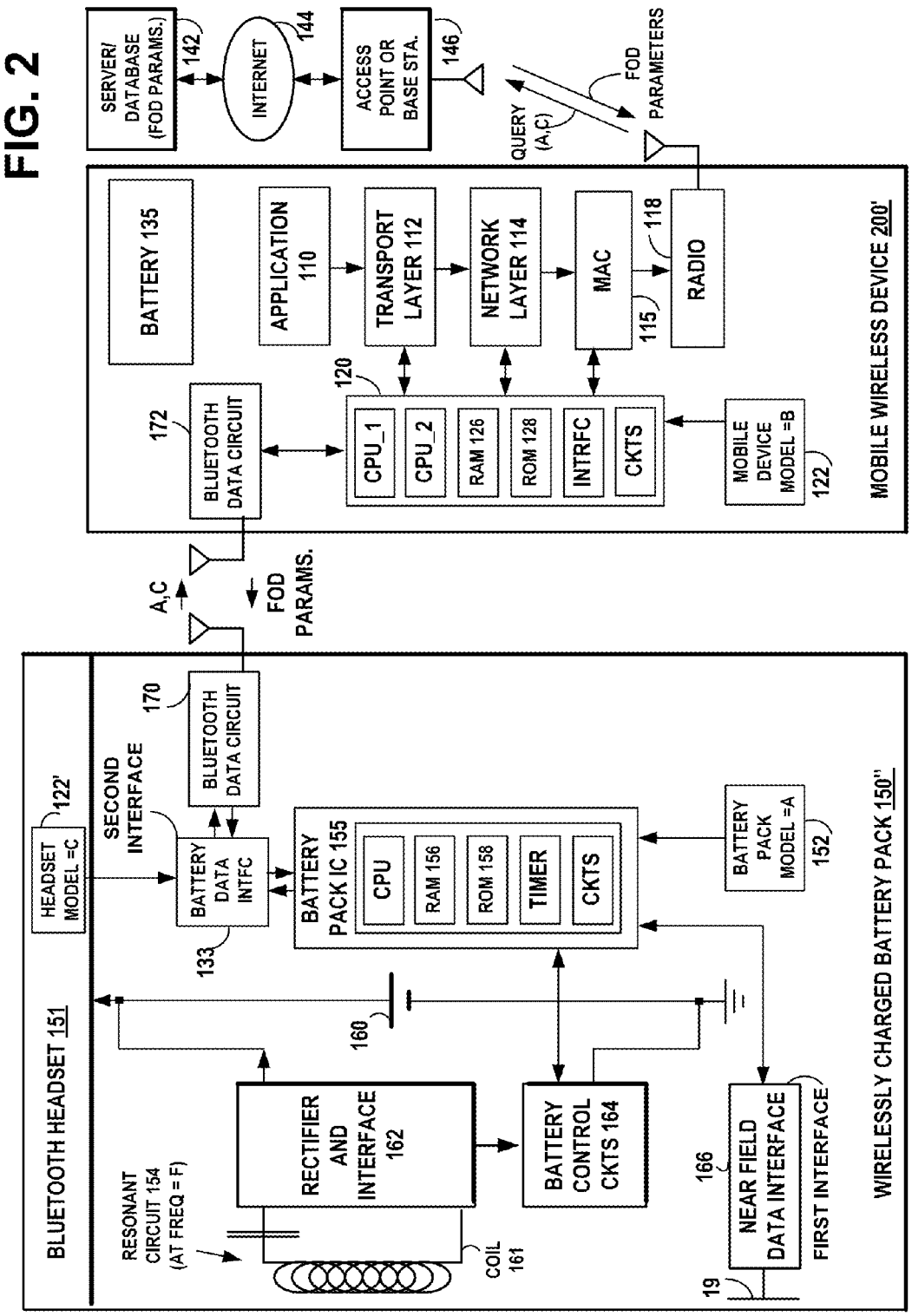

| COMPONENT MODEL | STRUCTURE | FOD PARAMETERS | |
| --- | --- | --- | --- |
| | | POWER LOSS | COMBINED |
| MOBILE DEVICE MODEL = B | METALLIC CASING TRIM | 8 mW | 18 mW |
| BATTERY PACK MODEL = A | METALLIC PCB LAYER | 10 mW | |
| HEADSET MODEL = C | METALLIC CONNECTORS | 2 mW | 12 mW |

SERVER / DATABASE (FOD PARAMETERS) 142

FIG. 4

METHOD, APPARATUS, AND COMPUTER PROGRAM PRODUCT FOR FOREIGN OBJECT DETECTION PARAMETER AND CHARGING DATA COMMUNICATION WITH WIRELESS CHARGING CAPABLE BATTERY PACK

FIELD

The field of the invention relates to wireless short-range communication and more particularly to device-to-device charging.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Bluetooth™ is an example of a short-range wireless technology quickly gaining acceptance in the marketplace. In addition to Bluetooth™ other short-range communication technologies include Bluetooth™ Low Energy, IEEE 802.11 wireless local area network (WLAN), Wireless USB, ZigBee (IEEE 802.15.4, IEEE 802.15.4a), and ultra-high frequency radio frequency identification (UHF RFID) technologies. All of these wireless communication technologies have features and advantages that make them appropriate for various applications.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. *The Bluetooth™ Core Specification, Version* 4.0 includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection that may be used to exchange specific information for another communications protocol, which may then be used to create an actual connection in the other communications protocol, such as Bluetooth™ or wireless local area network (WLAN).

Batteries are essential for the portability of wireless terminals, for example cellular phones, wireless headsets, and other portable communication devices. Rechargeable batteries in cellular phones, wireless headsets, and other portable communication devices, such as NiCd, nickel-metal hydride (NiMH), lithium iron phosphate (LiFePO$_4$), Lithium-ion, and Lithium-Polymer batteries, may be recharged with household alternating current (AC) power coupled through a voltage reduction transformer, an alternating-to-direct current converter, and appropriate battery monitoring and charging circuits.

SUMMARY

Method, apparatus, and computer program product example embodiments provide device-to-device charging.

An example embodiment of the invention includes a method comprising:

accessing, by an apparatus, parameters relating to power loss in wirelessly charging a rechargeable battery, when the battery is located in a device to be powered by the rechargeable battery; and transmitting, by the apparatus, to a wireless charger, the accessed parameters relating to power loss when the apparatus is associated with the device to be powered by the rechargeable battery.

An example embodiment of the invention includes a method comprising:

transmitting, by the apparatus, a type identification of the rechargeable battery, via an interface for device communication, to the device to be powered by the rechargeable battery, for forwarding with a type identification of the device to be powered by the rechargeable battery, to access a storage containing the parameters relating to power loss when the apparatus is associated with the device to be powered by the rechargeable battery.

An example embodiment of the invention includes a method comprising:

receiving, by the apparatus, via an interface for device communication, the accessed parameters relating to power loss when the apparatus is associated with the device to be powered by the rechargeable battery.

An example embodiment of the invention includes a method comprising:

wherein the accessed parameters relating to power loss are based on a type identification of the rechargeable battery and a type identification of the device to be powered by the rechargeable battery.

An example embodiment of the invention includes a method comprising:

wirelessly transmitting, by the apparatus, a type identification of the rechargeable battery and a type identification of the device to be powered by the rechargeable battery, to a communications device, for accessing a storage containing the parameters relating to power loss when the apparatus is associated with the device to be powered by the rechargeable battery; and wirelessly receiving, by the apparatus, from the communications device, the accessed parameters relating to power loss when the apparatus is associated with the device to be powered by the rechargeable battery, based on the type identification of the rechargeable battery and the type identification of the device to be powered by the rechargeable battery.

An example embodiment of the invention includes an apparatus comprising:

at least one processor;

at least one memory including computer program code;

the at least one memory and the computer program code configured to, with the at least one processor, cause the apparatus at least to:

access parameters relating to power loss in wirelessly charging a rechargeable battery, when the battery is located in a device to be powered by the rechargeable battery; and transmit to a wireless charger, the accessed parameters relating to power loss when the apparatus is associated with the device to be powered by the rechargeable battery.

An example embodiment of the invention includes an apparatus comprising:

the at least one memory and the computer program code configured to, with the at least one processor, cause the apparatus at least to:

transmit a type identification of the rechargeable battery, via an interface for device communication, to the device to be powered by the rechargeable battery, for forwarding with a type identification of the device to be powered by the rechargeable battery, to access a storage containing the parameters relating to power loss when the apparatus is associated with the device to be powered by the rechargeable battery.

An example embodiment of the invention includes an apparatus comprising:

the at least one memory and the computer program code configured to, with the at least one processor, cause the apparatus at least to:

receive via the interface for device communication, the accessed parameters relating to power loss when the apparatus is associated with the device to be powered by the rechargeable battery.

An example embodiment of the invention includes an apparatus comprising:

wherein the accessed parameters relating to power loss are based on a type identification of the rechargeable battery and a type identification of the device to be powered by the rechargeable battery.

An example embodiment of the invention includes an apparatus comprising:

the at least one memory and the computer program code configured to, with the at least one processor, cause the apparatus at least to:

wirelessly transmit a type identification of the rechargeable battery and a type identification of the device to be powered by the rechargeable battery, to a communications device, for accessing a storage containing the parameters relating to power loss when the apparatus is associated with the device to be powered by the rechargeable battery; and wirelessly receive from the communications device, the accessed parameters relating to power loss when the apparatus is associated with the device to be powered by the rechargeable battery, based on the type identification of the rechargeable battery and the type identification of the device to be powered by the rechargeable battery.

An example embodiment of the invention includes an apparatus comprising:

wherein the accessed parameters relating to power loss when the apparatus is associated with the device to be powered by the rechargeable battery, are Foreign Object Detection (FOD) parameter data that comprise at least one power loss value.

An example embodiment of the invention includes an apparatus comprising:

wherein the rechargeable battery is configured to provide power to a mobile device and wherein the interface for device communication with the device to be powered by the rechargeable battery, comprises a Mobile Industry Processor Interface (MIPI) battery interface.

An example embodiment of the invention includes an apparatus comprising:

a battery pack;

a charging circuitry configured to receive electrical power from a charger and to charge the battery pack;

a first interface for charger communication with the charger; and a second interface for device communication with an electrically powered device.

An example embodiment of the invention includes a computer program product comprising computer executable program code recorded on a computer readable, non-transitory storage medium, the computer executable program code comprising:

code for accessing, by an apparatus, parameters relating to power loss in wirelessly charging a rechargeable battery, when the battery is located in a device to be powered by the rechargeable battery; and code for transmitting, by the apparatus, to a wireless charger, the accessed parameters relating to power loss when the apparatus is associated with the device to be powered by the rechargeable battery.

An example embodiment of the invention includes a computer program product comprising:

code for transmitting, by the apparatus, a type identification of the rechargeable battery, via an interface for device communication, to the device to be powered by the rechargeable battery, for forwarding with a type identification of the device to be powered by the rechargeable battery, to access a storage containing the parameters relating to power loss when the apparatus is associated with the device to be powered by the rechargeable battery.

An example embodiment of the invention includes a computer program product comprising:

code for receiving, by the apparatus, via the interface for device communication, the accessed parameters relating to power loss when the apparatus is associated with the device to be powered by the rechargeable battery.

An example embodiment of the invention includes a computer program product comprising:

wherein the accessed parameters relating to power loss are based on a type identification of the rechargeable battery and a type identification of the device to be powered by the rechargeable battery.

An example embodiment of the invention includes a method comprising:

receiving, by an apparatus, from a rechargeable battery connected to the apparatus, a type identification of the rechargeable battery connected to the apparatus, via an interface for device communication, the apparatus to be powered by the rechargeable battery;

forwarding, by the apparatus, the type identification of the rechargeable battery connected to the apparatus, with a type identification of the apparatus, to access a storage containing parameters relating to power loss in wirelessly charging the rechargeable battery when connected to the apparatus; and transmitting, by the apparatus, via the interface for device communication, to the rechargeable battery, the accessed parameters relating to power loss, for forwarding to a wireless charger.

An example embodiment of the invention includes a method comprising:

wirelessly transmitting, by the apparatus, the type identification of the rechargeable battery and the type identification of the apparatus, to the storage, for accessing the parameters relating to power loss when the rechargeable battery is connected to the apparatus; and wirelessly receiving, by the apparatus, from the storage, the accessed parameters relating to power loss when the rechargeable battery is connected to the apparatus, based on the type identification of the rechargeable battery and the type identification of the apparatus.

An example embodiment of the invention includes an apparatus comprising:

at least one processor;

at least one memory including computer program code;

the at least one memory and the computer program code configured to, with the at least one processor, cause the apparatus at least to:

receive from a rechargeable battery connected to the apparatus, a type identification of the rechargeable battery connected to the apparatus, via an interface for device communication, the apparatus to be powered by the rechargeable battery;

forward the type identification of the rechargeable battery connected to the apparatus, with a type identification of the apparatus, to access a storage containing parameters relating to power loss in wirelessly charging the rechargeable battery when connected to the apparatus; and transmit, via the interface for device communication, to the rechargeable battery, the accessed parameters relating to power loss, for forwarding to a wireless charger.

An example embodiment of the invention includes an apparatus comprising:

the at least one memory and the computer program code configured to, with the at least one processor, cause the apparatus at least to:

wirelessly transmit the type identification of the rechargeable battery and the type identification of the apparatus, to the storage, for accessing the parameters relating to power loss when the rechargeable battery is connected to the apparatus; and wirelessly receive from the storage, the accessed parameters relating to power loss when the rechargeable battery is connected to the apparatus, based on the type identification of the rechargeable battery and the type identification of the apparatus.

An example embodiment of the invention includes an apparatus comprising:

wherein the accessed parameters relating to power loss are Foreign Object Detection (FOD) parameter data that comprise at least one power loss value.

An example embodiment of the invention includes an apparatus comprising:

wherein the rechargeable battery is configured to provide power to a mobile device and wherein the interface for device communication comprises a Mobile Industry Processor Interface (MIPI) battery interface.

An example embodiment of the invention includes a computer program product comprising computer executable program code recorded on a computer readable, non-transitory storage medium, the computer executable program code comprising:

code for receiving, by an apparatus, from a rechargeable battery connected to the apparatus, a type identification of the rechargeable battery connected to the apparatus, via an interface for device communication, the apparatus to be powered by the rechargeable battery;

code for forwarding, by the apparatus, the type identification of the rechargeable battery connected to the apparatus, with a type identification of the apparatus, to access a storage containing parameters relating to power loss in wirelessly charging the rechargeable battery when connected to the apparatus; and code for transmitting, by the apparatus, via the interface for device communication, to the rechargeable battery, the accessed parameters relating to power loss, for forwarding to a wireless charger.

An example embodiment of the invention includes a computer program product comprising:

code for wirelessly transmitting, by the apparatus, the type identification of the rechargeable battery and the type identification of the apparatus, to the storage, for accessing the parameters relating to power loss when the rechargeable battery is connected to the apparatus; and code for wirelessly receiving, by the apparatus, from the storage, the accessed parameters relating to power loss when the rechargeable battery is connected to the apparatus, based on the type identification of the rechargeable battery and the type identification of the apparatus.

The example embodiments of the invention provide device-to-device charging.

DESCRIPTION OF THE FIGURES

FIG. 2 illustrates an example alternate embodiment of the invention shown in FIG. 1, wherein the wireless charger is wirelessly charging the rechargeable battery in a wirelessly rechargeable battery pack that is contained in Bluetooth headset. The wirelessly rechargeable battery pack wirelessly transmits at least one of the type identification of the rechargeable battery and a type identification of the Bluetooth headset, to the mobile wireless device. The mobile wireless device wirelessly transmits the type identification of the rechargeable battery and/or the type identification of the mobile wireless device as the query term to the remote database, for accessing the parameters relating to power loss during wireless charging when the wirelessly rechargeable battery pack is connected to the Bluetooth headset. The wirelessly rechargeable battery pack wirelessly receives from the mobile wireless device, the accessed parameters relating to power loss when the wirelessly rechargeable battery pack is connected to the Bluetooth headset, based on the type identification of the rechargeable battery in the apparatus and/or the type identification of the Bluetooth headset to be powered by the rechargeable battery. The wirelessly rechargeable battery pack may then transmit to the wireless charger, the accessed parameters relating to power loss when the wirelessly rechargeable battery pack is connected to the Bluetooth headset, in accordance with at least one embodiment of the present invention.

FIG. 4 is an example diagram of the memory in the database, storing parameters relating to power loss when the wirelessly rechargeable battery pack is associated with another device, such as Foreign Object Detection (FOD) parameter data that comprise at least one power loss value, in accordance with at least one embodiment of the present invention.

DISCUSSION OF EXAMPLE EMBODIMENTS OF THE INVENTION

Figure 1:
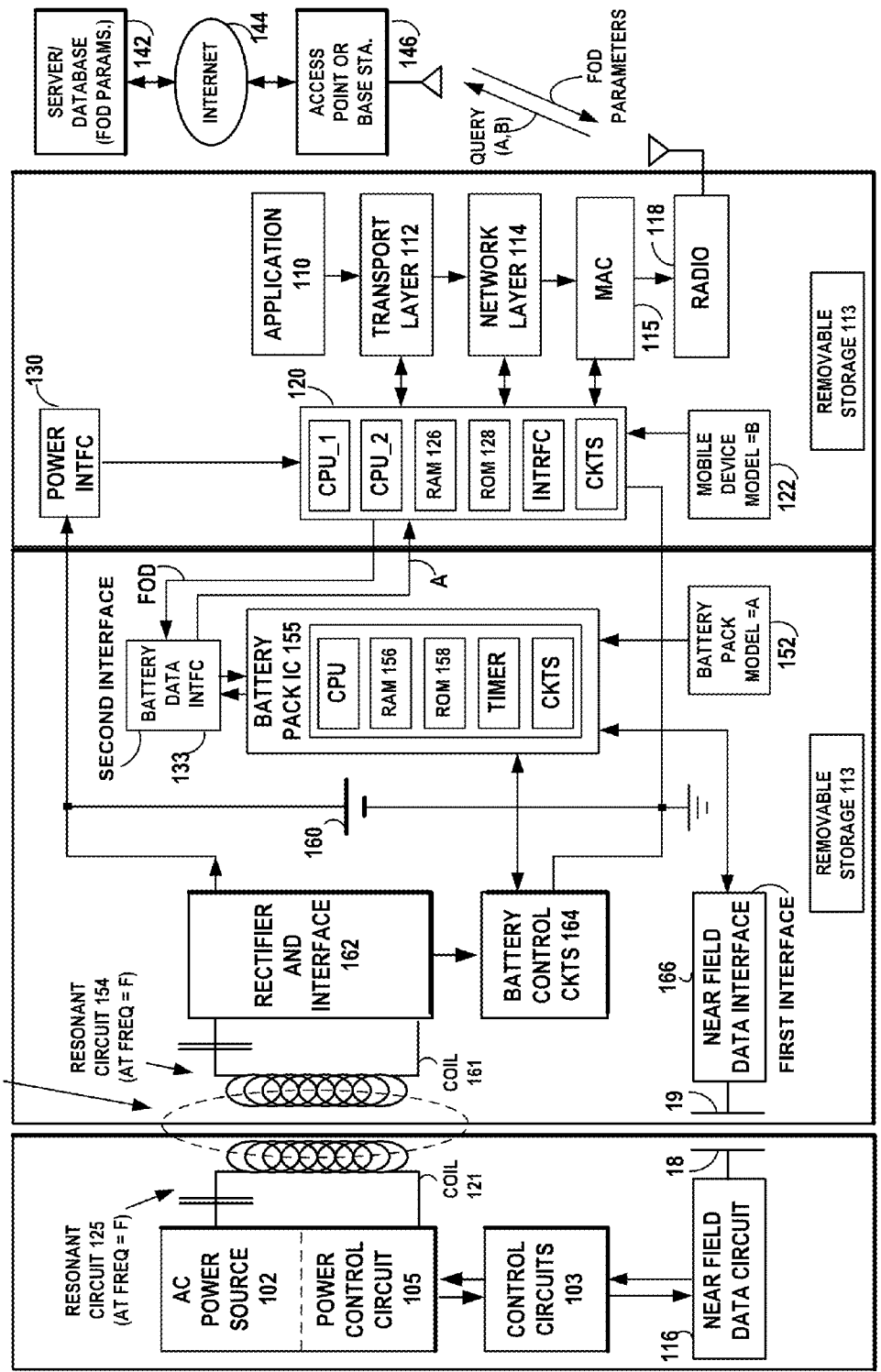
FIG. 1 illustrates an example embodiment of the invention, wherein a wireless charger is wirelessly charging a rechargeable battery in a wirelessly rechargeable battery pack that is contained in a mobile wireless device. The wirelessly rechargeable battery pack transmits a type identification of the rechargeable battery, via an interface for device communication, to the mobile wireless device. The mobile wireless device combines the type identification of the rechargeable battery with a type identification of the mobile wireless device and uses that as a query term to wirelessly access a remote database. The database stores parameters relating to power loss when the wirelessly rechargeable battery pack is contained in the mobile wireless device. The mobile wireless device wirelessly receives the accessed parameters from the remote database. The mobile wireless device passes the accessed parameters to the wirelessly rechargeable battery pack via the interface for device communication. The accessed parameters relating to power loss when the wirelessly rechargeable battery pack is contained in the mobile wireless and charged by the wireless charger, may be based on the type identification of the rechargeable battery and/or the type identification of the mobile wireless device. The wirelessly rechargeable battery pack may then transmit to the wireless charger, the accessed parameters relating to power loss, in accordance with at least one embodiment of the present invention.

This section is organized into the following topics:
A. Wireless Short-Range Communication Networks
B. WLAN Communication Technology
C. Bluetooth™ Communication Technology
D. Near-Field Communication (NFC) Technology
E. Wireless Charging Technology
F. Foreign Object Detection Parameter and Charging Data Communication With Wireless Charging Capable Battery Pack A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), Zig-Bee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. WLAN Communication Technology

The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control* (MAC) *and Physical Layer* (PHY) *Specifications*, February 2012. Since then, emerging broadband applications have stimulated interest in developing very high-speed wireless networks for short range communication, for example, the planned IEEE 802.11 ac, and the planned IEEE 802.11 ad WLAN specifications that are to provide a very high throughput in higher frequency bands. Applications of these IEEE 802.11 standards include products such as consumer electronics, telephones, personal computers, and access points for both for home and office.

C. Bluetooth™ Communication Technology

A procedure for forming connections between Bluetooth™ devices is described in the *Bluetooth™ Specification*, Version 4, Jun. 30, 2010. Bluetooth profiles augment the Bluetooth Specification, to describe which portions of the Bluetooth protocol stack and parameter ranges are in order to perform certain use cases, such a serial data port for the exchange of data and digital voice and music between Bluetooth devices. The Bluetooth Generic Access Profile (GAP) defines the basic generic procedures for discovery of Bluetooth devices and for link management of connecting to Bluetooth devices, and is the core on which all other Bluetooth profiles are based. The Serial Port Profile (SPP) defines the requirements for Bluetooth devices in order for setting up emulated serial cable connections between two Bluetooth devices for the exchange of data and digital voice and music. The Bluetooth Headset Profile depends upon the Serial Port Profile and defines the requirements for Bluetooth devices in order to support use cases such as a wireless headset, wireless keyboard, wireless mouse, wireless speaker, and the like.

The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation includes inquiry, inquiry scanning, inquiry response, paging, page scanning, and page response procedures.

D. Near-Field Communication (NFC) Technology

Near-field communication (NFC) technology communicates between two NFC Devices or between an NFC Device and an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The user may bring the two NFC devices close to one another to allow near field communication between the devices. Communication between two NFC devices occurs when they are brought within close proximity of each other: A simple wave or touch can establish an NFC connection that may be used to exchange specific information for another communications protocol, which may then be used to create an actual connection in the other communications protocol.

NFC technology is an extension of the ISO/IEC 14443 proximity-card standard for contactless smartcards and radio frequency ID (RFID) devices, which combines the interface of a contactless smartcard and a reader into a single device, and uses the ISO/IEC 18092 NFC communication standard to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. The ISO/IEC 18092 standard defines communication modes for Near Field Communication Interface and Protocol (NFCIP-1) using inductively coupled devices operating at the center frequency of 13,56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

In alternate example embodiments of the invention, RFID transponders may be used in devices, which may be the passive type or the active type, instead of the NFC transponders. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with the wireless device A and device B and the user brings the RFID transponder on the device A close to an RFID reader circuit in device B to allow near field communication between the devices. In example embodiments, both devices A and B may have RFID reader circuits to read RFID signals from the other device.

In an example embodiment, the wireless transceiver carrier in devices may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) short-range carrier is described, for example, ISO 11785 (air interface protocol), ISO 14443 (air interface protocol), and ISO 15693.

An example of the Near Field Communication (NFC) short-range carrier is described, for example, in ISO/IEC 14443 and ISO/IEC 18092.

An example of the Infrared Data Association (IrDA) short-range carrier is described, for example, in *IrDA Link Access Protocol*, v1.1 (1996).

An example of the Ultra Wide Band (UWB) short-range carrier is described, for example, in *WiMedia Common Radio Platform Specification*, Version 1.5 (2010).

E. Wireless Charging Technology

Rechargeable batteries in cellular phones and other portable communication devices, such as NiCd, nickel-metal hydride (NiMH), Lithium-ion, and Lithium-Polymer batteries and Super Capacitors, can be recharged with household alternating current (AC) power coupled through a voltage reduction transformer, an alternating-to-direct current converter, and appropriate battery monitoring and charging circuits. They can also be recharged with a 12-volt cigarette lighter socket provided in an automobile coupled through a DC voltage reduction circuit and appropriate battery monitoring and charging circuits. However, in both cases, the portable communication device must be plugged into the household AC power source or into the automobile power source, limiting the mobility of the communication device.

Recently, wireless charging has become available for rechargeable batteries in cellular phones and other portable communication devices, using contact-less electromagnetic induction. A power source circuit in a wireless charging device drives a circuit that produces a source alternating current in a frequency range for example between 50 kHz and 20 MHz, which is driven through a transmitting coil in the charging device. The alternating magnetic field produced by the transmitting coil inductively couples with a corresponding receiving coil in the cellular phone or other portable communication device, thereby producing a corresponding induced alternating current that drives a circuit at its resonant frequency in the range for example between 50 kHz and 20 MHz to produce an output AC voltage. A conversion circuit in the cellular phone or other portable communication device, uses a transformer to adjust the output AC voltage, an alternating-to-direct current converter, and appropriate battery monitoring and charging circuits to produce an appropriate DC charging voltage for the rechargeable battery.

Large sized wireless charging pads have become available to charge rechargeable batteries in multiple portable communication devices, high powered hand tools, domestic appliances, or garden tools using contact-less electromagnetic induction. Wireless charging pads are generally shaped as a flat plate and typically have an active charging surface approximately the size of a sheet of typing paper. Other shapes for the charging pad may not be flat, but instead shaped to conform to particularly shaped user devices to be charged, for example a charger shaped as a wall-mounted holder for a garden tool. Wireless charging pads use multiple transmitting coils or a single large transmitting coil to distribute their magnetic flux over the active charging surface. The mobile device (charged device) may provide control for the charger, particularly indicating desirable power levels and when to stop charging.

There are at least three methods of wireless charging: [1] inductive charging, [2] radio charging, and [3] resonance charging.

Inductive charging may be used for charging mid-sized items such as cell phones, MP3 players and PDAs. In inductive charging, the energy may be transferred from a primary coil to a secondary coil by electromagnetic induction. When a device requires a charge, it is placed on the charging pad, which may be plugged into a socket.

In radio charging, a transmitter, plugged into a socket, generates radio waves. When the receiver, attached to the device to be charged, is set to the same frequency as the transmitter, the transmitter will charge the device's battery.

In resonance charging, a copper coil attached to a power source comprises the sending unit. Another coil, attached to the device to be charged, is the receiver. Both coils are tuned to the same electromagnetic frequency, which makes it possible for energy to be transferred from the sending unit to the device to be charged. The resonance enables charging over a longer distance compared to regular inductive charging.

At least three typical coil alignment strategies are [1] guided positioning with tactile or optical feedback (e.g. a magnet or positioning markers), [2] free positioning using a moving coil, and [3] free positioning using coil array.

At least three techniques may be used by the charger, separately or together, to initially react to a new potentially chargeable device. These are [1] capacitance change (to detect a device), [2] resonance change (to detect device presence and location), and [3] digital ping (to get the desired power levels). The digital ping is also used to detect when the charged device has left the charging area.

In order to avoid unnecessary power consumption, the charger may be able to monitor the charging surface to detect placement or removal of objects. The charger may be also able to distinguish a valid rechargeable object from foreign objects, i.e., objects that are not capable of receiving wireless power from the charger. It may be also possible, e.g. for safety purposes, to detect that there is a foreign object in addition to a valid power receiver. The wireless power receiver may therefore indicate an estimate of the total amount of power that is consumed in the receiver during the power transfer. This power loss may take into account also any losses in the receiver, e,g., losses due to the secondary coil, receiver shielding.or in general any components in the receiver. The receiver may communicate this friendly power loss to the transmitter, which may use the information to determine presence of any foreign objects interfering the charging, e.g., by comparing the transmitted power and the reported power consumption estimate from the receiver.

In an example embodiment of the invention, the power management of wireless powering is arranged as part of Near Field Communication (NFC) operation. A special wireless powering mode is used to keep high power transfer efficiency on during the whole data transfer session of the wireless memory operation. Power transfer of 20-50 mW power class can be done using standard NFC transceivers and typical NFC antennas up to 30 mm distances. The higher power classes of 50-100 mW and 100-150 mW requires special circuits and are arranged as follows:

1. NFC antenna are extended with additional switchable antenna elements and/or other components that the same antenna system can operate in at least two modes/states (low-Q for communication purposes and high-Q for power transfer purposes).

2. The standard NFC transmit (Tx)/receive (Rx) circuitry is disconnected in mobile device and other device after negotiations with standard NFC communication, and the system is set to the high-Q state to increase Q>100 at mobile device and other device, and up to 150 mW power is available in the other device (during the charging period or wireless memory communication period). At the end of the wireless memory session, the antenna system returns to low-Q state returning Q of the antennas to ~30 and NFC communication could be used to end the session.

3. NFC antennas extended with additional components to improve power transmission efficiency so that >75% of the 200 mW available in standard NFC transmitter antenna is transferred into the other device (during the charging period or wireless memory communication period).

Cellular phones, other portable communication devices, and rechargeable battery packs that are equipped for wireless charging, incorporate a variety of materials in their packaging and components. The outer casing of the device may be metal or include metallic structures. The printed circuit boards in the interior of the device may include metallic layers forming a ground plane. The antennas, connectors, and display screens of the device may include metallic structures. When these metallic structures are exposed the alternating magnetic field in the wireless charging process, eddy currents are induced in the metallic structures that dissipate some of the power of the alternating magnetic field that was intended to induce the charging current in the power receiving coil of the device. For a given amplitude and frequency of the alternating magnetic field, the amount of power dissipation is a function of the characteristics of the device, such as the resistivity, size, and shape of the metallic structures in the device. In order to compensate for the power dissipation due to the metallic structures in the device, either power must be increased in the alternating magnetic field or the charging duration must be longer. The amount of compensation for the power dissipation will vary with the configuration of the metallic structures in the particular model of the device being wirelessly charged.

F. Foreign Object Detection Parameter and Charging Data Communication With Wireless Charging Capable Battery Pack In an example embodiment of the invention, wirelessly rechargeable battery packs in cellular phones and other mobile wireless devices, may control the wireless charger, to adjust the wireless power applied by the wireless charger to charging the rechargeable battery, based on the accessed Foreign Object Detection (FOD) parameters relating to power loss when the wirelessly rechargeable battery pack is contained in or associated with the mobile wireless device.

FIG. 1 illustrates an example embodiment of the invention, wherein a wireless charger 100 is wirelessly charging a rechargeable battery 160 in a wirelessly rechargeable battery pack 150 that is contained in a mobile wireless device 200. In accordance with an example embodiment of the invention, the wirelessly rechargeable battery pack 150 controls the wireless charger 100, to compensate for variations in power dissipation due to variations in the configuration of metallic structures in the particular models of the battery pack 150 and mobile wireless device 200.

In accordance with an example embodiment of the invention, the wirelessly rechargeable battery pack 150 may transmit a "take-over" message via the battery data interface 133, to the mobile wireless device, which defines the battery charging functions that the wirelessly rechargeable battery pack 150 wants to perform. In response, the mobile wireless device may disable the corresponding battery charging functions in the mobile wireless device.

In accordance with an example embodiment of the invention, the wirelessly rechargeable battery pack 150 may transmit a type identification "A" of the battery pack 150, via the interface 133 for device communication, to the mobile wireless device 200. The mobile wireless device 200 may combine the type identification "A" of the battery pack 150 with a type identification "B" of the mobile wireless device 200 and uses the combined values "(A,B)" as a query term to wirelessly access a remote database 142 via an access point or base station 146 and the Internet 144. Alternately, the mobile wireless device 200 may wirelessly transmit each of the type identification "A" of the rechargeable battery pack 150" and the type identification "B" of the mobile wireless device 200, as separate query terms "A" and "B" to the remote database 142. In an example embodiment, either form of the query may be transmitted to the database 142. In accordance with an example embodiment of the invention, the wirelessly rechargeable battery pack 150 may also measure the charging status of the rechargeable battery 160 by measuring the charging current, charging voltage, and charge level of the battery 160 and may communicate the charging status to the mobile wireless device 200 via the interface 133 for device communication.

In accordance with an example embodiment of the invention, the database 142 stores Foreign Object Detection (FOD) parameters relating to power loss when the wirelessly rechargeable battery pack 150 is contained in the mobile wireless device 200. In response to the mobile wireless device 200 wirelessly accessing the database 142, the mobile wireless device 200 wirelessly receives the accessed Foreign Object Detection (FOD) parameters from the remote database 142.

In accordance with an example embodiment of the invention, the memory 126, 128 of the mobile wireless device 200 may contain FOD parameters relating to power loss occurring in the mobile wireless device 200 during wireless charging. The mobile wireless device 200 may access the FOD parameters in the memory.

In accordance with an example embodiment of the invention, the mobile wireless device 200 passes the accessed parameters to the wirelessly rechargeable battery pack 150 via the interface 133 for device communication. The interface 133 for device communication may comprise a Mobile Industry Processor Interface (MIPI) battery interface. The accessed Foreign Object Detection (FOD) parameters relating to power loss when the wirelessly rechargeable battery pack is contained in the mobile wireless, may be based on the type identification "A" of the battery pack 150 and/or the type identification "B" of the mobile wireless device.

In accordance with an example embodiment of the invention, the wirelessly rechargeable battery pack 150 may communicate the FOD parameters received from the mobile wireless device 200 to the wireless charger 100. Such communication may be established for example via the wireless power transfer interface and implemented by load modulation, where the wirelessly charger battery pack 150 modulates the power signal supplied by the charger 100 according the FOD parameter data. After receiving the FOD parameter data, the charger 100 may control its operation, e.g., by adjusting the wireless power of the alternating magnetic field 140 applied by the wireless charger 100 to the receiving coil 161 of the wirelessly rechargeable battery pack 150, charging the rechargeable battery 160. The adjustment of the wireless power may be based on the received Foreign Object Detection (FOD) parameters relating to power loss when the wirelessly rechargeable battery pack 150 is contained in the mobile wireless device 200, in accordance with at least one embodiment of the present invention. Adjusting the power supplied may for example comprise reducing the amount of transmitted power when determining that there is a foreign object on the charging surface in addition to the charged device.

In accordance with an example embodiment of the invention, the wirelessly rechargeable battery pack 150 then controls the wireless charger 100 via the near field communications (NFC) data interface 166 that sends control signals to the near field communications (NFC) data interface 116 in the wireless charger 100. The control signals adjust the wireless power of the alternating magnetic field 140 applied by the wireless charger 100 to the receiving coil 161 of the wirelessly rechargeable battery pack 150, charging the rechargeable battery 160. The adjustment of the wireless power is based on the accessed Foreign Object Detection (FOD) parameters relating to power loss when the wirelessly rechargeable battery pack 150 is contained in the mobile wireless device 200, in accordance with at least one embodiment of the present invention.

The Foreign Object Detection (FOD) parameters relating to power loss, may be based on the extent that eddy currents are induced in the structures of the wirelessly rechargeable battery pack 150 and the mobile wireless device 200 when they are exposed to the alternating magnetic field of the wireless charger 100. The power loss may be a function of the thickness of the structure, the resistivity of the material in the structure, the mass of the structure, and the density of the material in the structure. In accordance with an example embodiment of the invention, the values of Foreign Object Detection (FOD) parameters relating to power loss, stored in the database 142, may be based on these structural characteristics.

The extent that eddy currents are induced in the structures of the wirelessly rechargeable battery pack 150 and the mobile wireless device 200 when they are exposed to the alternating magnetic field of the wireless charger 100, may also be based on the frequency of the alternating magnetic field and the peak magnetic field produced by the wireless charger 100. In accordance with an example embodiment of the invention, the wirelessly rechargeable battery pack 150 may also include these wireless power delivery characteristics of the wireless charger 100, in its control the wireless charger 100. The wirelessly rechargeable battery pack 150 may read the wireless power delivery characteristics of the wireless charger 100 via the near field communications (NFC) data interface 166 and the near field communications (NFC) data interface 116 in the wireless charger 100. The wirelessly rechargeable battery pack 150 may combine value of the frequency of the alternating magnetic field and value of the peak magnetic field produced by the wireless charger 100, with the value of the thickness of the structure, the value of the resistivity of the material in the structure, the value of the mass of the structure, and the value of the density of the material in the structure, to compute the power loss due to eddy currents induced in the structure. The control signals may be based on this computed power loss, to adjust the wireless power of the alternating magnetic field 140 applied by the wireless charger 100 to the receiving coil 161 of the wirelessly rechargeable battery pack 150, in accordance with at least one embodiment of the present invention.

The wireless charger 100 and the wirelessly charged battery pack 150 use contact-less electromagnetic induction to transfer the wireless power in the alternating magnetic field 140. The AC power source 102 in the wireless charger 100 drives a resonant frequency circuit 125 that produces a source alternating current in a frequency range for example between 50 kHz and 20 MHz, which is driven through the transmitting coil 121. The alternating magnetic field 140 of frequency F produced by the transmitting coil 121 inductively couples with a corresponding receiving coil 161 in the wirelessly charged battery pack 150, thereby producing a corresponding induced alternating current that drives a circuit 154 at its resonant frequency F in the range for example between 50 kHz and 20 MHz to produce an output AC voltage. A conversion circuit in the rectifier and interface 162 of wirelessly charged battery pack 150, uses a transformer to adjust the output AC voltage, an alternating-to-direct current converter, and appropriate battery monitoring and powering circuits to produce an appropriate DC powering voltage that is applied to the rechargeable battery 160. The rectifier and interface 162 outputs a regulated current and voltage to charge the positive terminal of battery 160 during the recharging operations.

In accordance with an example embodiment of the invention, the wirelessly charged battery pack 150 of FIG. 1, may comprise a battery pack IC 155 that includes a CPU, RAM memory 156, ROM memory 158, a timer, and circuits CKTS, and further comprises the battery control circuits 164, to provide a regulated current and voltage to the rechargeable battery 160. The RAM and ROM may be removable memory devices such as smart cards, SIMs, wireless identification modules (WIMs), semiconductor memories such as RAM, ROM, programmable read-only memories (PROMS), flash memory devices, etc. An application program may be embodied as program logic stored in the RAM and/or ROM in the form of sequences of programmed instructions which, when executed in the CPU, carry out the functions of the disclosed embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The battery 160 may comprise several batteries or cells. Removable storage media 113 may be included, to store data and/or computer program code as an example computer program product.

The figure further shows an example mobile wireless device 200 receiving power from the battery pack 150 via the power interface 130. The mobile wireless device 200 comprises a protocol stack, including the radio 118 and the media access control (MAC) 115, which may be based, for example, on various cellular telephone network standards, wireless local area network (LAN) standards, or other wireless communications standards. Other network types may make use of example embodiments of the invention. The protocol stack may also comprise a network layer 114, a transport layer 112, and application programs 110. The example wireless device 200 includes a processor 120 that may include a dual core central processing unit (CPU) CPU_1 and CPU_2, a random-access memory (RAM) memory 126, a read-only memory (ROM) memory 128, an interface for a keypad, display, and other input/output devices, and circuits (CKTS) to carry out the functions of the example embodiments. The interface circuits may interface with one or more radio transceivers, battery and other power sources, key pad, touch screen, display, microphone, speakers, ear pieces, camera or other imaging devices, etc. The RAM and ROM may be removable memory devices such as smart cards, SIMs, wireless identification modules (WIMs), semiconductor memories such as RAM, ROM, programmable read-only memories (PROMS), flash memory devices, etc. The processor protocol stack layers, and/or application program may be embodied as program logic stored in the RAM and/or ROM in the form of sequences of programmed instructions which, when executed in the CPU, carry out the functions of the disclosed embodiments. The program logic may be delivered to the writeable RAM, PROMS, flash memory devices, etc. of the processor from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device 200 may be separate transceiver circuits or alternately, the one or more radios may be a single radio frequency (RF) module capable of handling one or multiple channels in a high speed, time and frequency multiplexed manner in response to the processor.

The mobile wireless device 200 may be a communications device, such as a cell phone, portable radio, portable TV, PDA, laptop computer, palmtop computer, or the like, capable of communicating in a personal area network (PAN) for example via the Bluetooth protocol, local area network (LAN) for example via the IEEE 802.11 protocol, or wide area network (WAN) for example via a cellular system protocol.

FIG. 2 illustrates an example alternate embodiment of the invention shown in FIG. 1, wherein the wireless charger 100 of FIG. 1, is wirelessly charging the rechargeable battery 160 in the wirelessly rechargeable battery pack 150" that is contained in Bluetooth headset 151. Although described as a Bluetooth headset, headset 151 may in general represent any wirelessly rechargeable accessory of the mobile wireless device 200'. The wirelessly rechargeable battery pack 150" wirelessly transmits at least one of the type identification "A" of the rechargeable battery pack 150" and a type identification "C" of the Bluetooth headset 151, to the mobile wireless device 200, via the Bluetooth data circuit 170 and the Bluetooth data circuit 171 in the mobile wireless device, or any other available wired or wireless data interface to the mobile wireless device 200'. The wirelessly rechargeable battery pack 150" may combine both the type identifications "A" and "C" as a query term "(A,C)" to be wirelessly transmitted by the mobile wireless device 200 to access a remote database 142 via the access point or base station 146 and the Internet 144. Alternately, the mobile wireless device 200 may wirelessly transmit each or only one of the type identification "A" of the rechargeable battery pack 150" and the type identification "C" of the Bluetooth headset, as separate query terms "A" and "C" to the remote database 142. In an example embodiment, either form of the query may be transmitted to the database 142, for accessing the Foreign Object Detection (FOD) parameters relating to power loss when the wirelessly rechargeable battery pack 150" is connected to the Bluetooth headset 151.

The figure shows the wirelessly rechargeable battery pack 150" wirelessly receiving from the mobile wireless device 200, via the Bluetooth data circuit 170 and the Bluetooth data circuit 171 in the mobile wireless device, the accessed Foreign Object Detection (FOD) parameters. The accessed Foreign Object Detection (FOD) parameters relate to power loss when the wirelessly rechargeable battery pack 150" is connected to the Bluetooth headset 151, based on the type identification "A" of the rechargeable battery pack 150" and/or the type identification "C" of the Bluetooth headset 151 to be powered by the rechargeable battery 160.

The figure shows the wirelessly rechargeable battery pack 150" then controlling the wireless charger 100 of FIG. 1, to adjust the wireless power applied by the wireless charger 100 to charging the rechargeable battery 160, based on the accessed Foreign Object Detection (FOD) parameters relating to power loss when the wirelessly rechargeable battery pack 150" is connected to the Bluetooth headset 151, in accordance with at least one embodiment of the present invention.

In an alternate example embodiment of the invention, the wireless charger 100 may wirelessly charge the rechargeable battery 160 in the wirelessly rechargeable battery pack 150 of FIG. 1, when it is not contained in a mobile wireless device 200. In this alternate example embodiment, the wirelessly rechargeable battery pack 150 may transmit its type identification "A" of the battery pack 150, via the Bluetooth data circuit 170 and the Bluetooth data circuit 171 of FIG. 2, to the mobile wireless device 200. The mobile wireless device 200 then wirelessly transmits the type identification "A" of the battery pack 150 as a query term to wirelessly access a remote database 142 via the access point or base station 146 and the Internet 144. The database 142 returns the Foreign Object Detection (FOD) parameters relating to power loss for the wirelessly rechargeable battery pack 150 when it is not contained in the mobile wireless device 200. The mobile wireless device 200 wirelessly receives the accessed Foreign Object Detection (FOD) parameters from the remote database 142. The wirelessly rechargeable battery pack 150 wirelessly receives from the mobile wireless device 200, via the Bluetooth data circuit 170 and the Bluetooth data circuit 171, the accessed Foreign Object Detection (FOD) parameters. The wirelessly rechargeable battery pack 150 of FIG. 1 then controls the wireless charger 100 via the wireless power transfer interface between coils 121 and 161 by sending control signals to the wireless charger 100. According to an embodiment, the wirelessly rechargeable battery pack 150 may use the near field communications (NFC) data interface 166 for sending the control signals. The control signals adjust the wireless power of the alternating magnetic field 140 applied by the wireless charger 100 to the receiving coil 161 of the wirelessly rechargeable battery pack 150, charging the rechargeable battery 160. The adjustment of the wireless power is based on the accessed Foreign Object Detection (FOD) parameters relating to power loss when the wirelessly rechargeable battery pack 150 is not contained in the mobile wireless device 200, in accordance with at least one embodiment of the present invention.

According to an embodiment of the invention, the wirelessly rechargeable battery pack 150 may pass the Foreign Object Detection (FOD) parameters, which may be received from the mobile wireless device 200 via the Bluetooth data circuit 170 and the Bluetooth data circuit 171, to the wireless charger 100 via the wireless power transfer interface between the coils 121 and 161. The wireless charger 100 may control its operation, e.g., by adjusting the wireless power applied by the wireless charger 100 to charging the rechargeable battery 160, based on the received Foreign Object Detection (FOD) parameters relating to a power loss of the charged Bluetooth headset 151 and/or the wirelessly rechargeable battery pack 150. According to another embodiment, the Bluetooth data circuit 170 receiving the Foreign Object Detection (FOD) parameters may be comprised in the Bluetooth headset 151 and communicate the received parameters to the battery data interface 133 of the wirelessly charged battery pack 150.

Figure 3A:
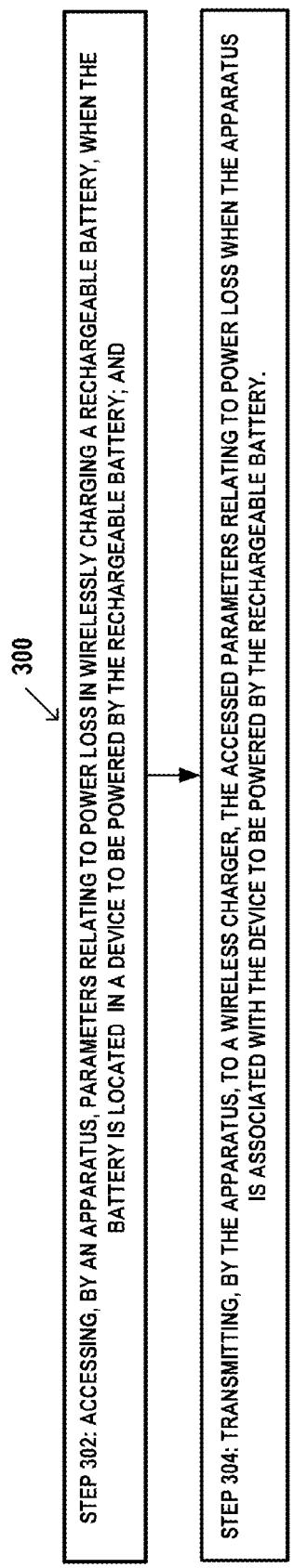
FIG. 3A discloses an example flow diagram of the operation of the wirelessly rechargeable battery pack, in accordance with at least one embodiment of the present invention.

FIG. 3A discloses an example flow diagram 300 of the operation of the wirelessly rechargeable battery pack 150, in accordance with at least one embodiment of the present invention. The steps of the flow diagram represent computer code instructions stored in the RAM and/or ROM memory of the device, which when executed by the central processing units (CPU), carry out the functions of the example embodiments of the invention. The steps may be carried out in another order than shown and individual steps may be combined or separated into component steps. The flow diagram has the following steps:

Step 302: accessing, by an apparatus, parameters relating to power loss in wirelessly charging a rechargeable battery, when the battery is located in a device to be powered by the rechargeable battery; and Step 304: transmitting, by the apparatus, to a wireless charger, the accessed parameters relating to power loss when the apparatus is associated with the device to be powered by the rechargeable battery.

Figure 3B:
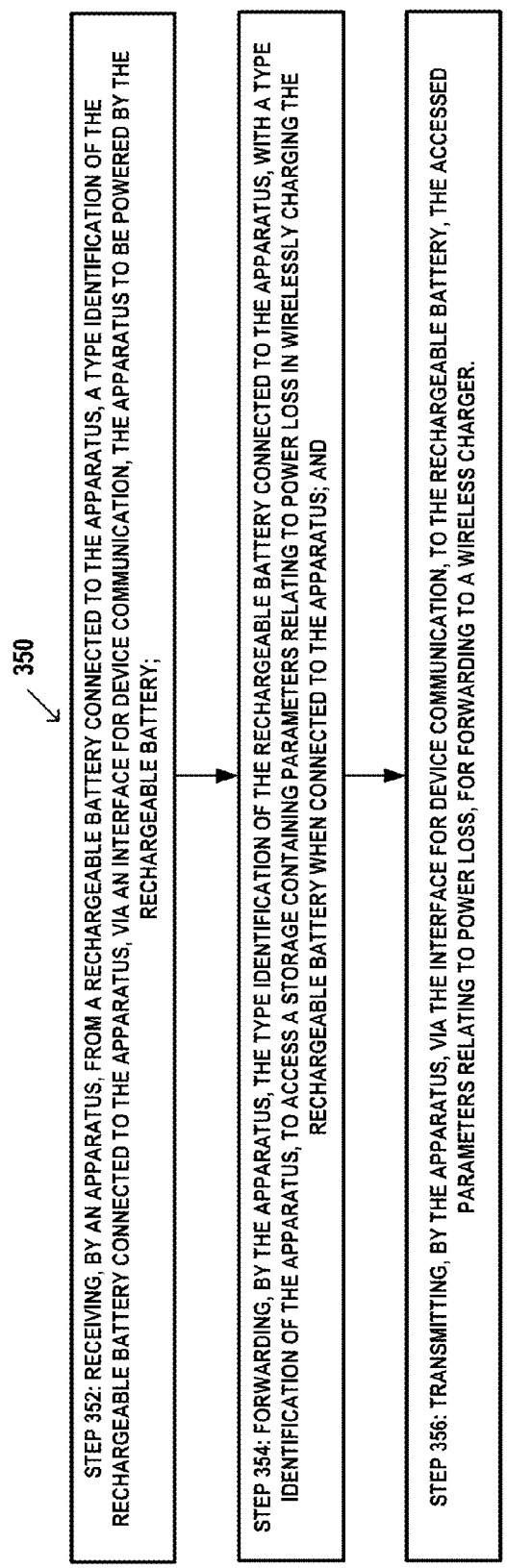
FIG. 3B discloses an example flow diagram of the operation of the mobile wireless device, in accordance with at least one embodiment of the present invention.

FIG. 3B discloses an example flow diagram 350 of the operation of the mobile wireless device 200, in accordance with at least one embodiment of the present invention. The steps of the flow diagram represent computer code instructions stored in the RAM and/or ROM memory of the device, which when executed by the central processing units (CPU), carry out the functions of the example embodiments of the invention. The steps may be carried out in another order than shown and individual steps may be combined or separated into component steps. The flow diagram has the following steps:

Step 352: receiving, by an apparatus, from a rechargeable battery connected to the apparatus, a type identification of the rechargeable battery connected to the apparatus, via an interface for device communication, the apparatus to be powered by the rechargeable battery;

Step 354: forwarding, by the apparatus, the type identification of the rechargeable battery connected to the apparatus, with a type identification of the apparatus, to access a storage containing parameters relating to power loss in wirelessly charging the rechargeable battery when connected to the apparatus; and Step 356: transmitting, by the apparatus, via the interface for device communication, to the rechargeable battery, the accessed parameters relating to power loss, for forwarding to a wireless charger.

FIG. 4 is an example diagram of the memory in the database 142, storing parameters relating to power loss when the wirelessly rechargeable battery pack 150 is associated with another device, such as Foreign Object Detection (FOD) parameter data that comprise at least one power loss value, in accordance with at least one embodiment of the present invention. The figure shows the database storing the type or model identification "A" of the battery pack 150 that has structural characteristics of a metallic printed circuit board (PCB) layer that contributes a power loss of 10 milliWatts in wireless charging operations. The figure shows the database storing the type or model identification "B" of the mobile wireless device 200 that has structural characteristics of a metallic casing trim that contributes a power loss of 8 milliWatts in wireless charging operations. The figure shows that the combination "(A,B)" of the battery pack 150 and the mobile wireless device 200 have a combined power loss of 18 milliWatts in wireless charging operations. The figure shows the database storing the type or model identification "C" of the Bluetooth headset 151 that has structural characteristics of metallic connectors that contributes a power loss of 2 milliWatts in wireless charging operations. The figure shows that the combination "(A,C)" of the battery pack 150 and the Bluetooth headset 151 have a combined power loss of 12 milliWatts in wireless charging operations. FIG. 4 also represents an example diagram of the memory 156, 158 of the mobile wireless device 200, according to embodiments of the invention.

Figure 5:
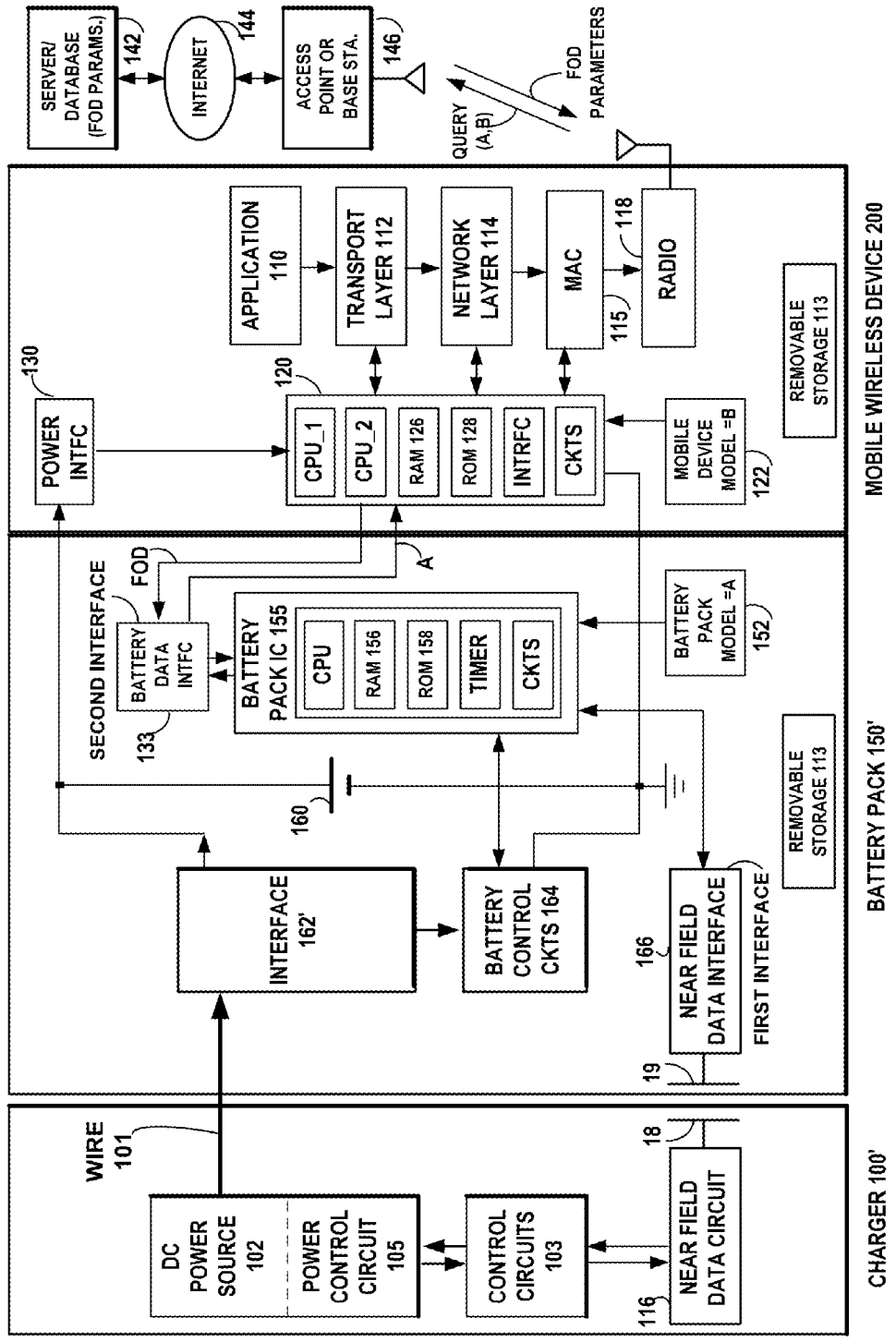
FIG. 5 illustrates an example alternate embodiment of the invention shown in FIG. 1, wherein the charger is connected by a wire to charge the rechargeable battery in a rechargeable battery pack that is contained in a mobile wireless device, in accordance with at least one embodiment of the present invention.

FIG. 5 illustrates an example alternate embodiment of the invention shown in FIG. 1, wherein the charger 100' is connected by a wire 101 to charge the rechargeable battery 160 in a rechargeable battery pack 150' that is contained in the mobile wireless device 200, in accordance with at least one embodiment of the present invention. The example alternate embodiment of FIG. 5 operates in a manner similar to that described for the example embodiment of FIG. 1, to access parameters from the database 142, which characterize charging by means of a wire connection 101, the rechargeable battery 160 in the rechargeable battery pack 150' contained in the mobile wireless device 200. In the example alternate embodiment of FIG. 5, the rechargeable battery pack 150' sends control signals to the near field communications (NFC) data interface 116 in the charger 100' to adjust the power transmitted by the wire 101 to the battery pack 150', to charge the rechargeable battery 160, in accordance with at least one embodiment of the present invention.

Figure 6:
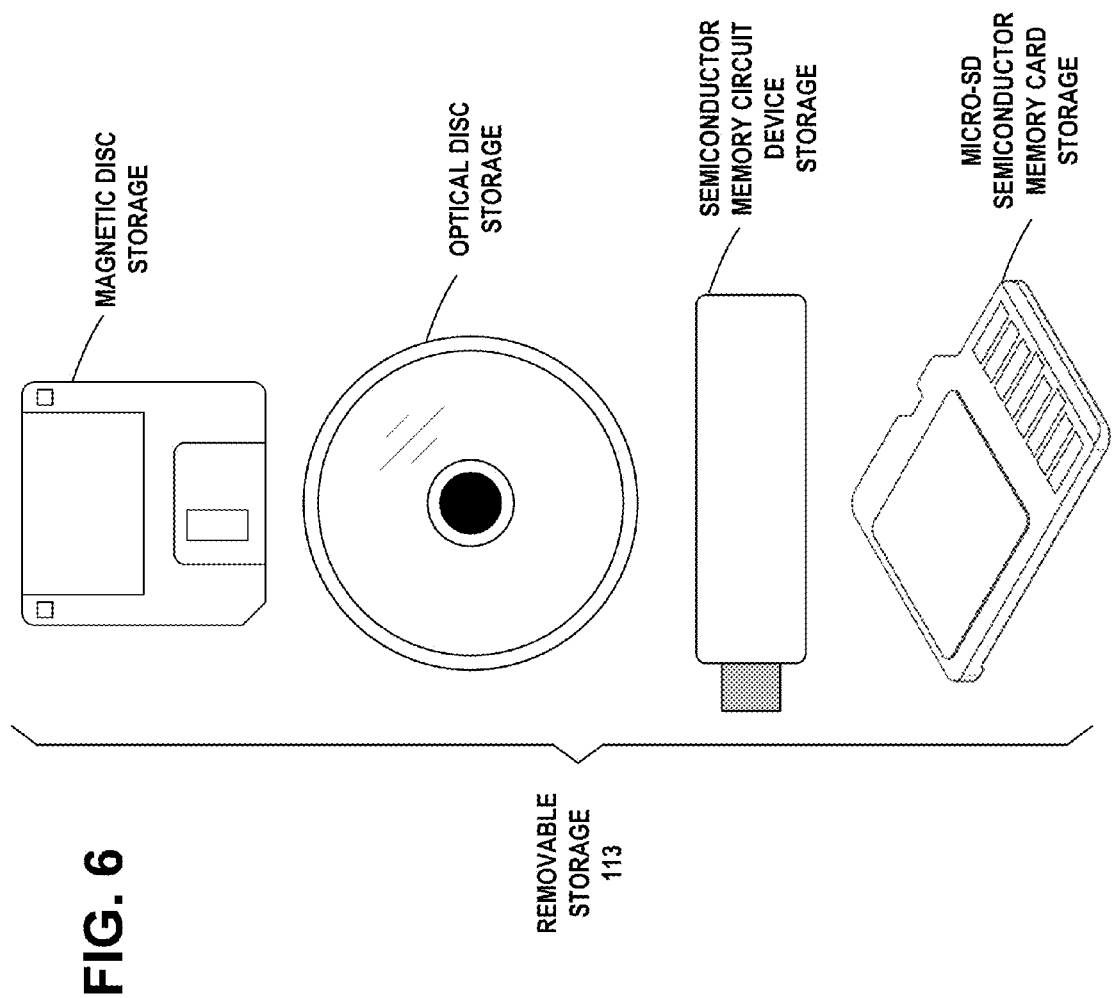
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 6 illustrates an example embodiment of the invention, wherein examples of removable storage media 113 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), ZigBee (IEEE 802.15.4, IEEE 802.15.4a), and near field communication technologies, such as radio frequency identification (RFID) and near field communication (NFC) technology that enable contactless identification and interconnection of wireless devices.

An example of the Bluetooth™ short-range communications protocol is described, for example, Bluetooth™ devices is described in the Bluetooth™ Specification, Version 4, Jun. 30, 2010.

An example of the Radio Frequency Identification (RFID) short-range communications protocol is described, for example, ISO 11785 (air interface protocol), ISO 14443 (air interface protocol), and ISO 15693.

An example of the Near Field Communication (NFC) short-range communications protocol is described, for example, in ISO/IEC 14443 and ISO/IEC 18092.

An example of the Infrared Data Association (IrDA) short-range communications protocol is described, for example, in IrDA Link Access Protocol, v1.1 (1996).

An example of the Ultra Wide Band (UWB) short-range communications protocol is described, for example, in WiMedia Common Radio Platform Specification, Version 1.5 (2010).

An example of the IEEE 802.11 WLAN communications protocol is described, for example, in IEEE 802.11-2012, Wireless Medium Access Control (MAC) and Physical Layer (PHY) Specifications, 29 Mar. 2012.

Example embodiments of the invention are applicable to cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Fixed Access (BWA) (LMDS, WiMAX, AIDAAS and HiperMAN), or the like networks, as well as short range networks such as Bluetooth, Zigbee, IEEE 802.11, Digital Enhanced Cordless Telecommunications (DECT), Hiper-LAN, Radio Frequency Identification (RFID), Wireless USB, DSRC (Dedicated Short Range Communications), Near Field Communication, wireless sensor networks, EnOcean; TransferJet, Ultra-wideband (UWB from WiMedia Alliance), WLAN, WiFi, and HiperLAN.

In an example embodiment of the invention, an apparatus comprises:

means for accessing, by an apparatus, parameters relating to power loss in wirelessly charging a rechargeable battery, when the battery is located in a device to be powered by the rechargeable battery; and means for transmitting, by the apparatus, to a wireless charger, the accessed parameters relating to power loss when the apparatus is associated with the device to be powered by the rechargeable battery.

In an example embodiment of the invention, an apparatus comprises:

means for receiving, by an apparatus, from a rechargeable battery connected to the apparatus, a type identification of the rechargeable battery connected to the apparatus, via an interface for device communication, the apparatus to be powered by the rechargeable battery;

means for forwarding, by the apparatus, the type identification of the rechargeable battery connected to the apparatus, with a type identification of the apparatus, to access a storage containing parameters relating to power loss in wirelessly charging the rechargeable battery when connected to the apparatus; and means for transmitting, by the apparatus, via the interface for device communication, to the rechargeable battery, the accessed parameters relating to power loss, for forwarding to a wireless charger.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   accessing, by an apparatus, parameters relating to power loss in wirelessly charging a rechargeable battery, when the battery is located in a device to be powered by the rechargeable battery;
   transmitting, by the apparatus, to a wireless charger, the accessed parameters relating to power loss when the apparatus is coupled with the device to be powered by the rechargeable battery; and
   causing, by the apparatus, the wireless charger to adjust wireless power applied by the wireless charger to charge the rechargeable battery, based on a first one of the parameters representing a first power loss due to eddy currents induced in the structure of the rechargeable battery in wireless charging operations and a second one of the parameters representing a second power loss due to eddy currents induced in the structure of the device to be powered by the rechargeable battery in wireless charging operations.

2. The method of claim 1, further comprising:
   transmitting, by the apparatus, a type identification of the rechargeable battery, via an interface for device communication, to the device to be powered by the rechargeable battery, for forwarding with a type identification of the device to be powered by the rechargeable battery, to access a storage containing the parameters relating to power loss when the apparatus is coupled with the device to be powered by the rechargeable battery.

3. The method of claim 1, further comprising:
   receiving, by the apparatus, via an interface for device communication, the accessed parameters relating to power loss when the apparatus is coupled with the device to be powered by the rechargeable battery.

4. The method of claim 1, further comprising:
   wherein the accessed parameters relating to power loss are based on a type identification of the rechargeable battery and a type identification of the device to be powered by the rechargeable battery.

5. The method of claim 1, further comprising:
   wirelessly receiving, by the apparatus, a type identification of the rechargeable battery and a type identification of the device to be powered by the rechargeable battery, to a communications device, for accessing a storage containing the parameters relating to power loss when the apparatus is coupled with the device to be powered by the rechargeable battery; and
   wirelessly receiving, by the apparatus, from the communications device, the accessed parameters relating to power loss when the apparatus is coupled with the device to be powered by the rechargeable battery, based on the type identification of the rechargeable battery and the type identification of the device to be powered by the rechargeable battery.

6. An apparatus, comprising:
   at least one processor;
   at least one memory including computer program code;
   the at least one memory and the computer program code configured to, with the at least one processor, cause the apparatus at least to:
   access parameters relating to power loss in wirelessly charging a rechargeable battery, when the battery is located in a device to be powered by the rechargeable battery;
   transmit to a wireless charger, the accessed parameters relating to power loss when the apparatus is associated with the device to be powered by the rechargeable battery; and
   cause the wireless charger to adjust wireless power applied by the wireless charger to charge the rechargeable battery, based on a first one of the parameters representing a first power loss due to eddy currents induced in the structure of the rechargeable battery in wireless charging operations and a second one of the parameters representing a second power loss due to eddy currents induced in the structure of the device to be powered by the rechargeable battery in wireless charging operations.

7. The apparatus of claim 6, further comprising:
   the at least one memory and the computer program code configured to, with the at least one processor, cause the apparatus at least to:
   transmit a type identification of the rechargeable battery, via an interface for device communication, to the device to be powered by the rechargeable battery, for forwarding with a type identification of the device to be powered by the rechargeable battery, to access a storage containing the parameters relating to power loss when the apparatus is coupled with the device to be powered by the rechargeable battery.

8. The apparatus of claim 6, further comprising:
   the at least one memory and the computer program code configured to, with the at least one processor, cause the apparatus at least to:
   receive via the interface for device communication, the accessed parameters relating to power loss when the apparatus is coupled with the device to be powered by the rechargeable battery.

9. The apparatus of claim 6, wherein the accessed parameters relating to power loss are based on a type identification of the rechargeable battery and a type identification of the device to be powered by the rechargeable battery.

10. The apparatus of claim 6, further comprising:
    the at least one memory and the computer program code configured to, with the at least one processor, cause the apparatus at least to:
    wirelessly transmit a type identification of the rechargeable battery and a type identification of the device to be powered by the rechargeable battery, to a communications device, for accessing a storage containing the parameters relating to power loss when the apparatus is coupled with the device to be powered by the rechargeable battery; and
    wirelessly receive from the communications device, the accessed parameters relating to power loss when the apparatus is coupled with the device to be powered by the rechargeable battery, based on the type identification of the rechargeable battery and the type identification of the device to be powered by the rechargeable battery.

11. The apparatus of claim 6, wherein the accessed parameters relating to power loss when the apparatus is coupled with the device to be powered by the rechargeable battery, are Foreign Object Detection (FOD) parameter data that comprise at least one power loss value.

12. The apparatus of claim 6, wherein the rechargeable battery is configured to provide power to a mobile device and wherein the interface for device communication with the device to be powered by the rechargeable battery, comprises a Mobile Industry Processor Interface (MIPI) battery interface.

13. An apparatus, comprising:
a battery pack;
a charging circuitry configured to receive electrical power from a charger and to charge the battery pack;
a first interface for charger communication with the charger;
a second interface for device communication with an electrically powered device;
wherein the apparatus causes the wireless charger to adjust wireless power applied by the wireless charger to charge the rechargeable battery, based on a first one of the parameters representing a first power loss due to eddy currents induced in the structure of the rechargeable battery in wireless charging operations and a second one of the parameters representing a second power loss due to eddy currents induced in the structure of the device to be powered by the rechargeable battery in wireless charging operations.

14. A computer program product comprising computer executable program code recorded on a computer readable, non-transitory storage medium, the computer executable program code comprising:
code for accessing, by an apparatus, parameters relating to power loss in wirelessly charging a rechargeable battery, when the battery is located in a device to be powered by the rechargeable battery;
code for transmitting, by the apparatus, to a wireless charger, the accessed parameters relating to power loss when the apparatus is associated with the device to be powered by the rechargeable battery; and
code for causing, by the apparatus, the wireless charger to adjust wireless power applied by the wireless charger to charge the rechargeable battery, based on a first one of the parameters representing a first power loss due to eddy currents induced in the structure of the rechargeable battery in wireless charging operations and a second one of the parameters representing a second power loss due to eddy currents induced in the structure of the device to be powered by the rechargeable battery in wireless charging operations.

15. The computer program product of claim 14, further comprising:
code for transmitting, by the apparatus, a type identification of the rechargeable battery, via an interface for device communication, to the device to be powered by the rechargeable battery, for forwarding with a type identification of the device to be powered by the rechargeable battery, to access a storage containing the parameters relating to power loss when the apparatus is coupled with the device to be powered by the rechargeable battery.

16. The computer program product of claim 14, further comprising:
code for receiving, by the apparatus, via the interface for device communication, the accessed parameters relating to power loss when the apparatus is coupled with the device to be powered by the rechargeable battery.

17. The computer program product of claim 14, wherein the accessed parameters relating to power loss are based on a type identification of the rechargeable battery and a type identification of the device to be powered by the rechargeable battery.

18. A method, comprising:
receiving, by an apparatus, a type identification of a rechargeable battery connected to the apparatus, via an interface for device communication, the apparatus to be powered by the rechargeable battery;
forwarding, by the apparatus, the type identification of the rechargeable battery connected to the apparatus, with a type identification of the apparatus, to access a storage containing parameters relating to power loss in wirelessly charging the rechargeable battery when connected to the apparatus; and
transmitting, by the apparatus, via the interface for device communication, the accessed parameters relating to power loss, to a wireless charger; and
causing, by the apparatus, the wireless charger to adjust wireless power applied by the wireless charger to charge the rechargeable battery, based on a first one of the parameters representing a first power loss due to eddy currents induced in the structure of the rechargeable battery in wireless charging operations and a second one of the parameters representing a second power loss due to eddy currents induced in the structure of the device to be powered by the rechargeable battery in wireless charging operations.

19. The method of claim 18, further comprising:
wirelessly transmitting, by the apparatus, the type identification of the rechargeable battery and the type identification of the apparatus, to the storage, for accessing the parameters relating to power loss when the rechargeable battery is connected to the apparatus; and
wirelessly receiving, by the apparatus, from the storage, the accessed parameters relating to power loss when the rechargeable battery is connected to the apparatus, based on the type identification of the rechargeable battery and the type identification of the apparatus.

20. An apparatus, comprising:
at least one processor;
at least one memory including computer program code;
the at least one memory and the computer program code configured to, with the at least one processor, cause the apparatus at least to:
receive a type identification of a rechargeable battery connected to the apparatus, via an interface for device communication, the apparatus to be powered by the rechargeable battery;
forward the type identification of the rechargeable battery connected to the apparatus, with a type identification of the apparatus, to access a storage containing parameters relating to power loss in wirelessly charging the rechargeable battery when connected to the apparatus; and
transmit, via the interface for device communication, the accessed parameters relating to power loss, to a wireless charger; and cause the wireless charger to adjust wireless power applied by the wireless charger to charge the rechargeable battery, based on a first one of the parameters representing a first power loss due to eddy currents induced in the structure of the rechargeable battery in wireless charging operations and a second one of the parameters representing a second power loss due to eddy currents induced in the structure of the device to be powered by the rechargeable battery in wireless charging operations.

21. The apparatus of claim 20, further comprising:
the at least one memory and the computer program code configured to, with the at least one processor, cause the apparatus at least to:

wirelessly transmit the type identification of the rechargeable battery and the type identification of the apparatus, to the storage, for accessing the parameters relating to power loss when the rechargeable battery is connected to the apparatus; and wirelessly receive from the storage, the accessed parameters relating to power loss when the rechargeable battery is connected to the apparatus, based on the type identification of the rechargeable battery and the type identification of the apparatus.

22. The apparatus of claim 20, wherein the accessed parameters relating to power loss are Foreign Object Detection (FOD) parameter data that comprise at least one power loss value.

23. The apparatus of claim 20, wherein the rechargeable battery is configured to provide power to a mobile device and wherein the interface for device communication comprises a Mobile Industry Processor Interface (MIPI) battery interface.

24. A computer program product comprising computer executable program code recorded on a computer readable, non-transitory storage medium, the computer executable program code comprising:

code for receiving, by an apparatus, a type identification of a rechargeable battery connected to the apparatus, via an interface for device communication, the apparatus to be powered by the rechargeable battery;

code for forwarding, by the apparatus, the type identification of the rechargeable battery connected to the apparatus, with a type identification of the apparatus, to access a storage containing parameters relating to power loss in wirelessly charging the rechargeable battery when connected to the apparatus; and code for transmitting, by the apparatus, via the interface for device communication, the accessed parameters relating to power loss, to a wireless charger; and code for causing, by the apparatus, the wireless charger to adjust wireless power applied by the wireless charger to charge the rechargeable battery, based on a first one of the parameters representing a first power loss due to eddy currents induced in the structure of the rechargeable battery in wireless charging operations and a second one of the parameters representing a second power loss due to eddy currents induced in the structure of the device to be powered by the rechargeable battery in wireless charging operations.

25. The computer program product of claim 24, further comprising:

code for wirelessly transmitting, by the apparatus, the type identification of the rechargeable battery and the type identification of the apparatus, to the storage, for accessing the parameters relating to power loss when the rechargeable battery is connected to the apparatus; and code for wirelessly receiving, by the apparatus, from the storage, the accessed parameters relating to power loss when the rechargeable battery is connected to the apparatus, based on the type identification of the rechargeable battery and the type identification of the apparatus.

* * * * *